(12) United States Patent
Rhoton

(10) Patent No.: US 12,092,146 B2
(45) Date of Patent: Sep. 17, 2024

(54) SPEED NUT

(71) Applicant: Alpha 3D, LLC, Middleton, ID (US)

(72) Inventor: Donald Eugene Rhoton, Emmett, ID (US)

(73) Assignee: Alpha 3D LLC, Middleton, ID (US)

( * ) Notice: Subject to any disclaimer, the term of this patent is extended or adjusted under 35 U.S.C. 154(b) by 231 days.

(21) Appl. No.: 17/454,534

(22) Filed: Nov. 11, 2021

(65) Prior Publication Data

US 2022/0154756 A1 May 19, 2022

Related U.S. Application Data

(60) Provisional application No. 63/115,333, filed on Nov. 18, 2020.

(51) Int. Cl.
*F16B 37/08* (2006.01)
*B25B 27/06* (2006.01)

(52) U.S. Cl.
CPC ........ *F16B 37/0885* (2013.01); *B25B 27/062* (2013.01)

(58) Field of Classification Search
CPC .............. F16B 37/0871; F16B 37/0885; F16B 37/0892; B25B 27/062
USPC ......................................................... 411/433
See application file for complete search history.

(56) References Cited

U.S. PATENT DOCUMENTS

| | | | | |
|---|---|---|---|---|
| 370,168 A * | 9/1887 | Truxal | ................... | F16D 1/096 |
| | | | | 411/432 |
| 663,208 A * | 12/1900 | Wrensch | ............. | F16B 37/0864 |
| | | | | 411/433 |
| 1,510,492 A * | 10/1924 | Caron | ................. | F16B 37/0885 |
| | | | | 411/432 |
| 1,762,065 A * | 6/1930 | Lally | ...................... | F16L 37/101 |
| | | | | 285/38 |
| 2,649,314 A * | 8/1953 | Richardson | ............. | F16L 37/52 |
| | | | | 285/35 |
| 3,029,501 A * | 4/1962 | Leathers | ............... | B25B 27/026 |
| | | | | 29/213.1 |
| 3,097,559 A * | 7/1963 | Chapman | .............. | F16B 21/165 |
| | | | | 411/348 |
| 5,199,675 A | 4/1993 | DeGuchi | | |
| 6,821,070 B1 * | 11/2004 | Thompson | .......... | F16B 37/0885 |
| | | | | 411/432 |
| 7,661,915 B2 * | 2/2010 | Whipple | ............. | F16B 37/0885 |
| | | | | 411/432 |
| 8,696,286 B1 * | 4/2014 | Martin | .................... | B60B 29/00 |
| | | | | 269/95 |
| 10,639,752 B2 * | 5/2020 | Rasmussen | ........... | B25B 27/062 |
| 2015/0283689 A1 * | 10/2015 | Weaver | ................. | B25B 27/062 |
| | | | | 29/890.121 |

* cited by examiner

*Primary Examiner* — Flemming Saether
(74) *Attorney, Agent, or Firm* — Boyle Fredrickson, SC

(57) ABSTRACT

A speed nut provides a separable housing, when closed, defining an internally threaded cavity for engaging a threaded shaft, and when open, allowing movement of the speed nut along the shaft without engagement of the threads. Interdigitated knuckles on the housing portions provide robust resistance against axial shifting when the nut is used to apply axial force to the threaded shaft. The knuckles may also provide a hinge point allowing the nut to be opened and closed with a simple hinging action and a means for locking the nut portions together through a releasable pin passing through the opposite knuckles.

6 Claims, 3 Drawing Sheets

SPEED NUT

CROSS REFERENCE TO RELATED APPLICATION

The present application claims the benefit of US provisional application 63/115,333 filed Nov. 13, 2020 and hereby incorporated by reference.

BACKGROUND OF THE INVENTION

The present invention relates generally to speed nuts for rapid attachment to a threaded rod and subsequent use as a conventional nut, and in particular to a speed nut suitable for use in high-force valve extraction applications and the like.

Pumps used for the pumping of fluid used in oil and natural gas extraction operations may include valve seats that wear over time and must be replaced. These valve seats are usually press fit into a casting or the like and must be pulled free from within the casting using considerable force, for example, obtained through a hydraulic cylinder.

Valve seat pullers are known which can extend into a casting and pass through a valve seat to extract the valve seat. The pullers include jaws with outwardly extending teeth for engaging a backside of the valve seat and providing a threaded shaft attached to the puller which can extend out of the casting. The threaded shaft outside of the casting passes through a hydraulic pancake jack and then is received by a nut that may be threaded down along the threaded shaft to tighten against the outer surface of the pancake jack so that the pancake jack can provide the necessary high forces to the threaded shaft and ultimately to the valve seat. A valve seat puller of this design is taught by U.S. Pat. No. 10,639,752 assigned to the assignee of the present invention and hereby incorporated by reference.

The threaded shaft is given threads with a shallow pitch to improve resistance to axial force but with the drawback of requiring many turns of the nut to move the nut the length of the threaded shaft to tighten against the pancake jack. The time required for this operation can delay the replacement of critical valve components.

SUMMARY OF THE INVENTION

The present invention is a speed nut that can be rapidly attached to a point on the threaded shaft close to the pancake jack by separating the portions of the nut, positioning the nut, then clamping the portions of the nut about the threaded rod to be tightened in a conventional fashion. A "dual-knuckle" design allows rapid locking of the nut halves together to resist axial force using an axially-extending pin easily removed in the field and providing precise location of the nut halves' separation.

Specifically then, the present invention provides a speed nut having a first and second portion movable between a separated position and a closed position. In the closed position, the first and second portions abut to define an internally threaded cylindrical cavity extending along an axis and sized to receive and engage a corresponding threaded shaft for threaded rotation therethrough. The speed nut also includes at least one torsion arm having a proximal end attached to the housing and a distal end extending away from the axis to allow rotation of the housing about the threaded shaft when the first and second portions are in the closed position.

Each of the first and second portions provide outwardly extending knuckles at laterally opposed edges so that when the first and second portions are in the closed position, the knuckles of laterally opposed edges of the first portion interdigitate with the knuckles of the laterally opposed edges of the second portion to resist relative axial motion between the first and second portions.

It is thus a feature of at least one embodiment of the invention to provide a speed nut that can be rapidly positioned on a threaded rod and yet can provide high forces on that threaded rod. Resulting forces of axial displacement between the nut halves are resisted by mutual engagement of the knuckles which may nevertheless freely separate when the force is removed.

The knuckles may include bores along bore-axes parallel to the axis that align when the first and second portions are in the closed position. The bores may receive respective first and second pins to hold the first and second portions in the closed position.

It is thus a feature of at least one embodiment of the invention to provide a simple way of holding the speed nut in the closed position against forces of separation that may occur during use of the torsion handle. Again, the pins may be freely inserted and removed in a state of no torsion but robustly resist separation of the speed nut portions under torsion.

The knuckles receiving the first pin may be adapted to allow a hinging motion around the bore-axis of the first pin to move the first and second portions between the open and closed positions.

It is thus a feature of at least one embodiment of the invention to provide a simple method of allowing the first and second portions to be separated or closed while retaining alignment to prevent thread damage and to prevent full separation where the portions could be lost or damaged.

The first pin may provide a threaded end received by corresponding threads in at least one receiving knuckle to retain the first pin in the bore against pivoting motion of the first and second portions.

It is thus a feature of at least one embodiment of the invention to ensure retention of the hinge pin against sliding out from the knuckles while allowing disassembly for cleaning and the like.

The first pin when received by the knuckles may expose an end adapted to receive a driving tool for rotation of the first pin.

It is thus a feature of at least one embodiment of the invention to allow simple disassembly of the hinge pin without the need for impact, for example from a pin punch or the like, such as could damage the pin or it's receiving bore.

The second pin may include a spring detent releasably engaging the second pin with the knuckles receiving the second pin. In some embodiments, the spring detent may be a spring-loaded ball held captive in an end of the second pin to retract with motion of the end through a receiving bore of the knuckles and to extend outwardly at an opening from the receiving bore when the second pin is fully engaged in the receiving bore.

It is thus a feature of at least one embodiment of the invention to provide a simple method of retaining the speed nut in its closed position that is resistant from high forces of torsional separation and yet which allows rapid repositioning of the nut as desired. The detent system allows rapid installation and removal of the second pin without special tools and yet retention of the second pin against incidental forces of vibration and the like.

The second pin may further include a grip pivotally attached to an end of the second pin to be graspable when the second pin is fully engaged within the receiving bore for extraction of the second pin.

It is thus a feature of at least one embodiment of the invention to allow use of the speed nut in the field without special tools and provide an ample gripping surface without interference between the grip and the threaded rod by pivoting.

The speed nut may include two torsion arms each having a proximal end attached to a different one of the first and second portions and each having a distal end extending outward from the housing with radial symmetry about the axis.

It is thus a feature of at least one embodiment of the invention to allow high torsions to be applied to the speed nut in a balanced fashion while also resisting axial displacement of the speed nut portions.

The first and second portions may each be machined solid steel.

It is thus a feature of at least one embodiment of the invention to provide a design that can be fabricated without welds or seams that can create failure points.

These particular objects and advantages may apply to only some embodiments falling within the claims and thus do not define the scope of the invention.

DETAILED DESCRIPTION OF THE PREFERRED EMBODIMENT

Figure 1:
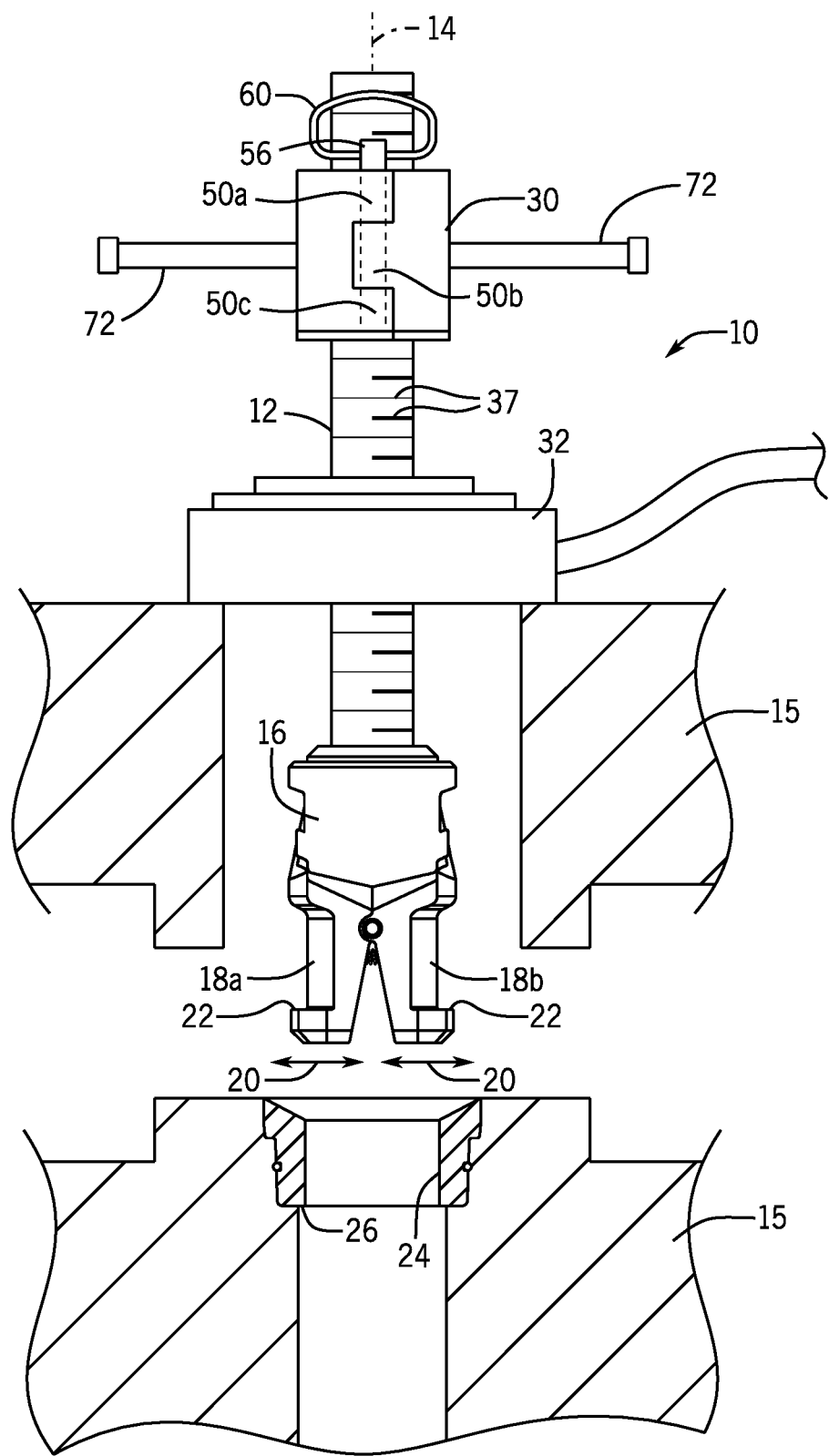
FIG. 1 is a simplified front, elevational cross-section of a valve having a valve seat showing positioning of a valve seat puller for removal of the valve seat, the valve seat communicating by means of the threaded shaft with a pancake hydraulic unit and speed nut of the present invention.
Figure 2:
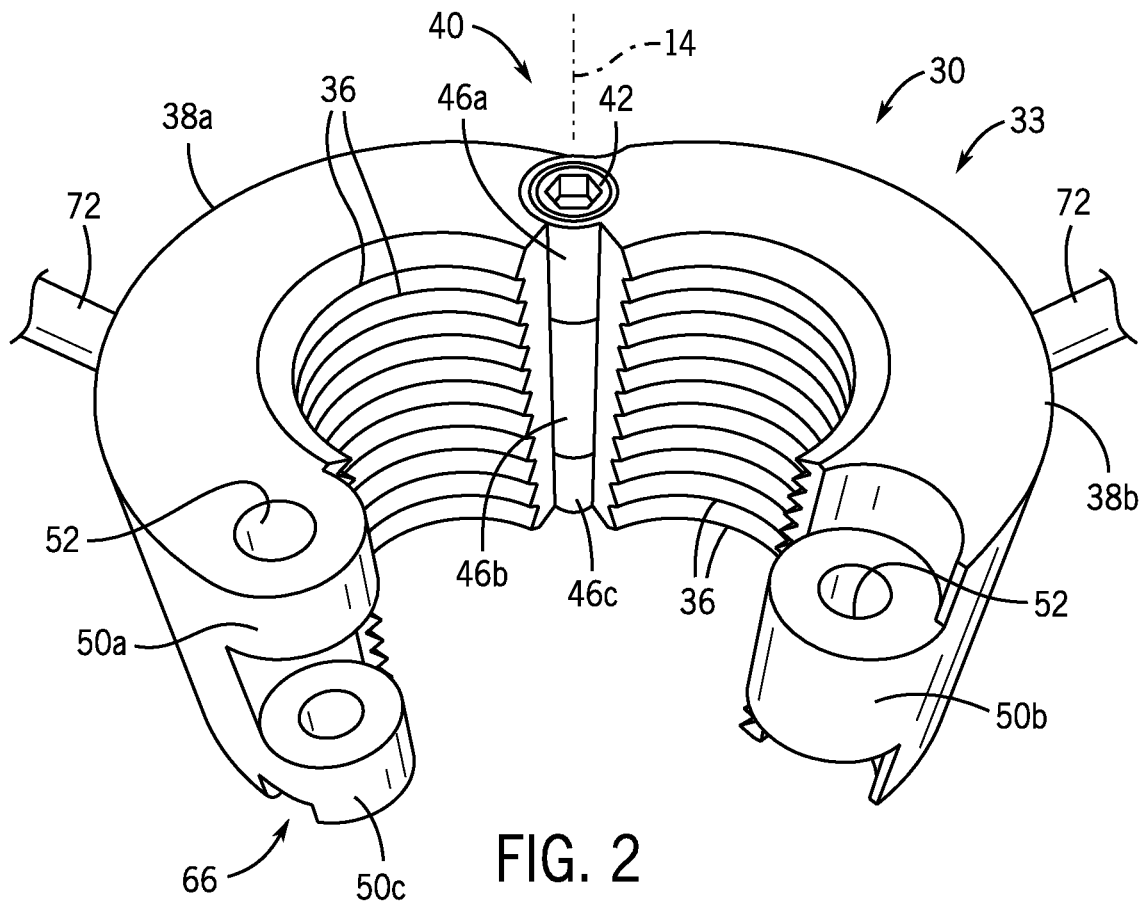
FIG. 2 is a side elevational fragmentary view of the speed nut showing the axial locking pin and its detent mechanism.

Referring now to FIG. 1, a valve seat puller 10 suitable for use with the present invention may include a threaded shaft 12 extending along the insertion axis 14 and attached at its lower end to a seat puller body 16 by a threaded coupling thereto. Extending from beneath the seat puller body 16 are first and second jaws 18a and 18b attached at their upper ends to the seat puller body 16 to be retained axially with respect to the seat puller body 16. Lower ends of the first and second jaws 18 hold at their lower tips outwardly extending ledges 22. The lower ends of the first and second jaws 18 may pivot with respect to each other inward and outward as indicated by arrows 20 to pass through a ring-shaped valve seat 24 and to extend on the other side of the valve seat 24 so that the ledges 22 can grip a backside 26 of the valve seat 24 to allow it to be extracted.

A speed nut 30 of the present invention may be threaded onto the upper end of the threaded shaft 12 to support the threaded shaft 12 against a pancake hydraulic cylinder 32 allowing substantial forces to be applied by the pancake hydraulic cylinder 32 to the seat puller 10 along axis 14 against a body of the valve or pump casting 15.

Figure 3:
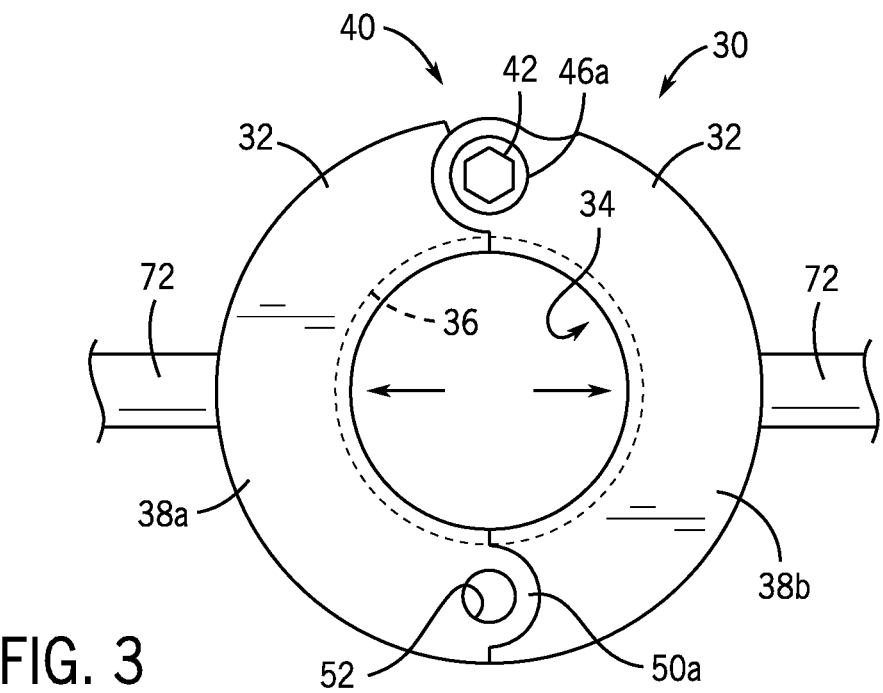
FIG. 3 is a top, fragmentary plan view of the speed nut showing the dual knuckle design that provides rapid separation of the nut halves and precise assembly around the threaded shaft.

Referring now to FIGS. 2-5, the speed nut 30 may, in a closed state as shown in FIGS. 1 and 3, provide for a generally cylindrical body 33 having an axial central bore 34 with internal threads 36 that may engage external threads 37 of the threaded shaft 12. The body 33 is composed of two halves 38a and 38 separated generally along a plane aligned with axis 14 to divide the body 33 into approximately equal halves. The halves 38a and 38b join at first vertical edges by a hinge 40 pivoting about a hinge pin 42 having an axis 44 offset but parallel to axis 14. The hinge 40 may provide for a set of vertically stacked knuckles 46a-46c arranged in the manner of a conventional door hinge with each knuckle 46 providing a generally cylindrical tube receiving the hinge pin 42 therethrough and the knuckles 46a-46c having sequentially abutting cylindrical bases with knuckles 46a and 46c being integrally formed with half 38a and flanking knuckles 46b being integrally formed with half 38b so that the two halves 38a and 38b may separate, pivoting about the axis 14 and yet be retained against relative axial movement by the inter-engagement of the knuckles 46.

The opposite vertical edges of the halves 38a and 38b which may pivot toward and away from each other, in a closed state, may be retained by inter-engaging knuckles 50a-50c, also arranged (when the halves 38a and 38b are close together) in a vertical stack with knuckles 50a and 50c being integral with half 38a and flanking knuckle 50b, the latter integrated with half 38b respectively. In the closed state, these knuckles 50 like knuckles 46 provide stacked interdigitated cylindrical tubes that resist axial movement of the halves 38 with respect to each other and provide central bores 52 which align in the closed state with the proper clearance between the threads 36. The central bores 52 may be retained in closed alignment by a quick release pin 56 (shown in FIGS. 1 and 4) threaded through the bores 52 now aligned along axis 57 parallel to but displaced from axis 14 and diametrically opposed to axis 44.

The quick release pin 56 may have a head portion 58 receiving a ring 60 that may be engaged by a user's fingers to release the pin 56 pulling it upwardly along axis 57. A bottom portion of the pin 56 may support a spring-loaded detent ball 62 engaging a lower lip 64 of knuckle 50c, for example, formed by a cut out 66 so that the end of the pin 56 terminates above a surface 70 of the nut 30 engaging the hydraulic pancake cylinder 32 while retaining the quick release pin 56 in position against minor vibration and the like.

Referring to FIGS. 1-4, optional, diametrically extending handles 72 may be welded or screwed in corresponding bores into the outer surfaces of the collars' halves 38a and 38b to assist in rotating the nut 30 and in separating the halves along the hinge axis 14 as desired for relocation. In this regard, it will be appreciated that the hinge 40 may be moved to the open state shown in FIG. 3 and quickly positioned along the axial direction over the threaded shaft 12 and then closed together, pivoting about the hinge 40, and held in the closed position by the quick release pin 56 inserted through the bores 52 in the knuckles 50 now in alignment. Rotation of the nut 30 using the handles 72 may then be accomplished in the manner of a conventional nut.

Figure 4:
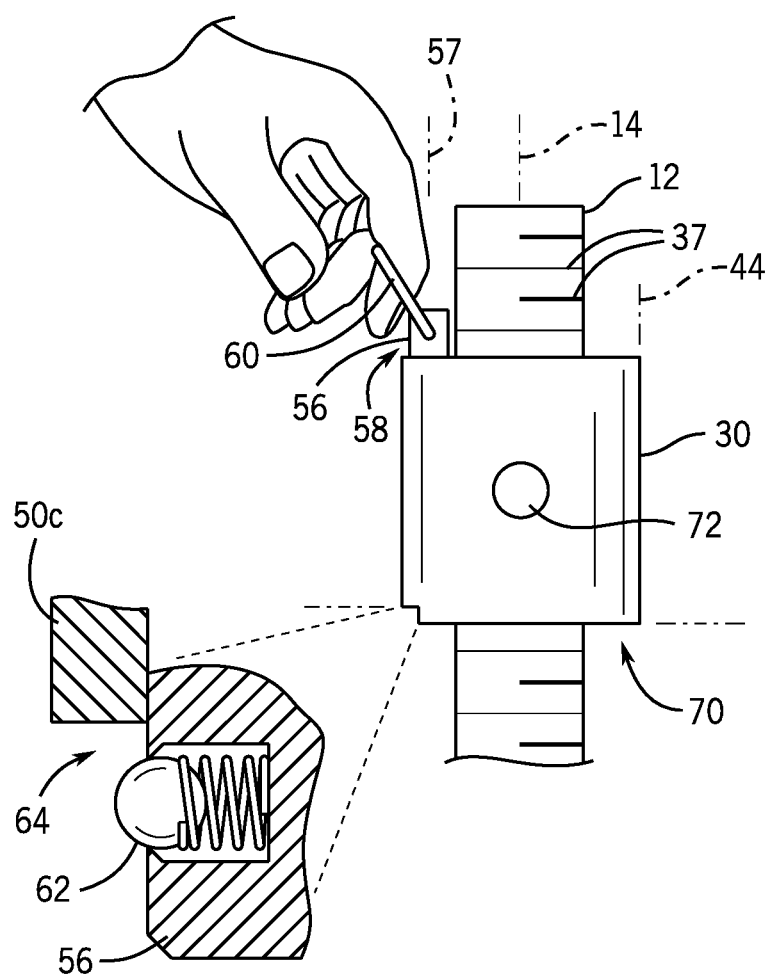
FIG. 4 is a perspective view of the nut opened for rapid adjustment to different locations on the threaded shaft of FIG. 1.
Figure 5:
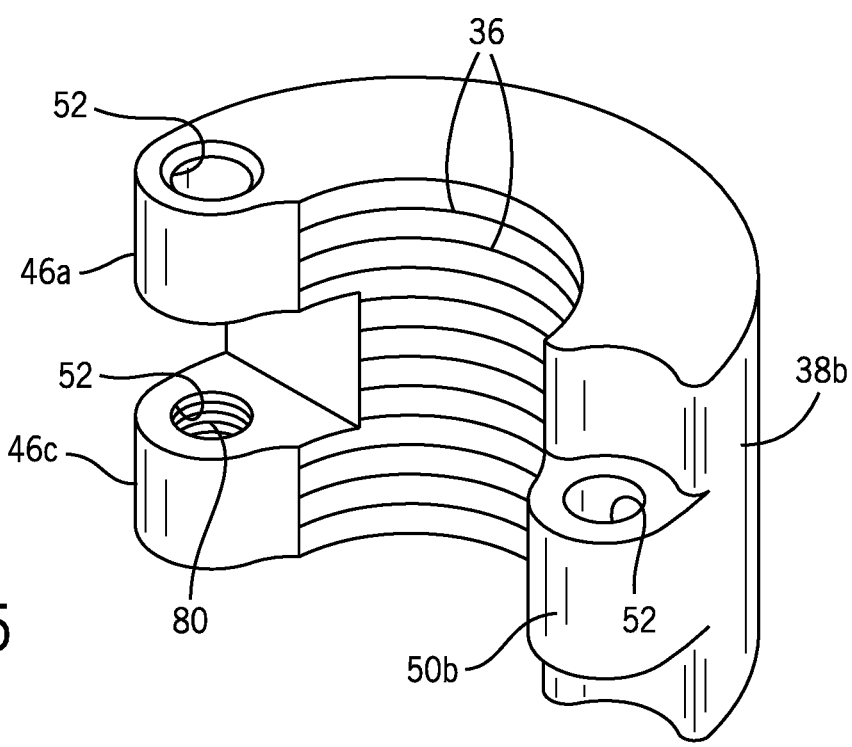
FIG. 5 is a perspective view of one half of the speed nut better showing the knuckle arrangement.

As shown in FIG. 4, the hinge pin 42 may be threaded at its lower end to engage corresponding internal threads 80 into knuckle 46c and may, for example, provide a hex cap screw head that is countersunk into knuckle 46a.

Generally the nut 30 will be made of a high quality steel or the like with the elements of halves 38a and 38b machined from respective single blocks of a steel element for high strength. The knuckles 46 and 50 may be outset from the threads 36 so that the threads 36 provide a continuous helix within the closed nut 30.

It is specifically intended that the present invention nut be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What I claim is:

1. A valve seat puller comprising:
    a threaded shaft attached at one end to a seat puller body having retractable ledges that may fit through a valve seat to engage a far side of the valve seat of a valve;
    a speed nut having a housing having a first and second portion movable between a separated position to be movable along a length of the threaded shaft without engagement of threads of the threaded shaft, and a closed position having the first and second portions abutting to define an internally threaded cylindrical cavity extending along an axis and sized to engage the threads of the threaded shaft extending through the speed nut for threaded rotation thereabout;
    torsion arms each having a proximal end affixed to the housing and a distal end extending away from the axis to allow rotation of the housing about the threaded shaft engaged with the internally threaded cylindrical cavity when the first and second portions are in the closed position to exert a force removing the valve seat when the seat puller body ledges engage the far side of the valve seat;
    wherein each of the first and second portions provide outwardly extending knuckles at laterally opposed edges of the first and second portions; and
    wherein when the first and second portions are in the closed position, the knuckles of laterally opposed edges of the first portion interdigitate with the knuckles of the laterally opposed edges of the second portion to resist relative axial motion between the first and second portions;
    wherein the knuckles include bores along bore-axes parallel to the axis that align when the first and second portions are in the closed position to receive respective first and second pins, axially therealong the knuckles of the laterally opposed edges of the first and second portions, to hold the first and second portions in the closed position; and
    wherein the second pin includes a spring detent releasably engaging the second pin with the knuckles receiving the second pin and further includes a grip pivotally attached to an end of the second pin to be graspable when the second pin is fully engaged within the receiving bore for extraction of the second pin.

2. The valve seat puller of claim 1 wherein the knuckles receiving the first pin are adapted to allow a hinging motion around the bore-axis of the first pin to move the first and second portions between the open and closed positions.

3. The valve seat puller of claim 2 wherein the first pin provides a threaded end received by corresponding threads at least one receiving knuckle to retain the first pin in the bore against pivoting motion of the first and second portions.

4. The valve seat puller of claim 3 wherein the first pin when received by the knuckles exposes an end adapted to receive a driving tool for rotation of the first pin.

5. The valve seat puller of claim 1 wherein the spring detent is a spring-loaded ball held captive in an end of the second pin to retract with motion of the end through a receiving bore of the knuckles and to extend outwardly at an opening from the receiving bore when the second pin is fully engaged in the receiving bore.

6. The valve seat puller of claim 1 wherein the first and second portions are each machined solid steel.

* * * * *